June 7, 1960

T. M. McCALL 2,939,519

SEAT BELT RETRACTING MECHANISM

Filed Sept. 27, 1956

T. M. McCALL
INVENTOR.

E. C. McRAE
J. R. FAULKNER
T. H. OSTER

BY

ATTORNEYS

June 7, 1960

T. M. McCALL 2,939,519

SEAT BELT RETRACTING MECHANISM

Filed Sept. 27, 1956

T. M. McCALL
INVENTOR.

E. C. McRAE
J. R. FAULKNER
T. H. OSTER

BY

ATTORNEYS

June 7, 1960
T. M. McCALL
2,939,519
SEAT BELT RETRACTING MECHANISM
Filed Sept. 27, 1956
3 Sheets-Sheet 3
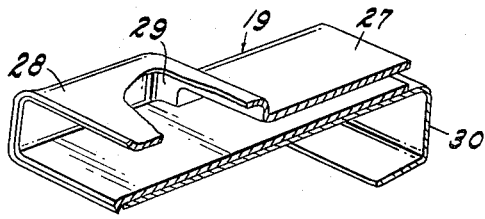
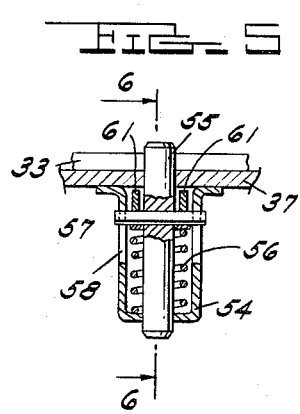
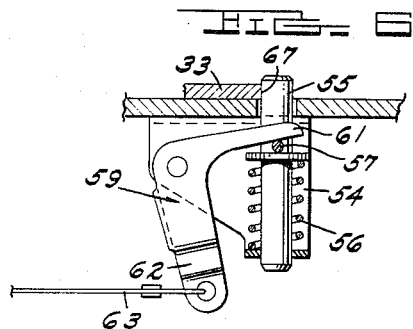
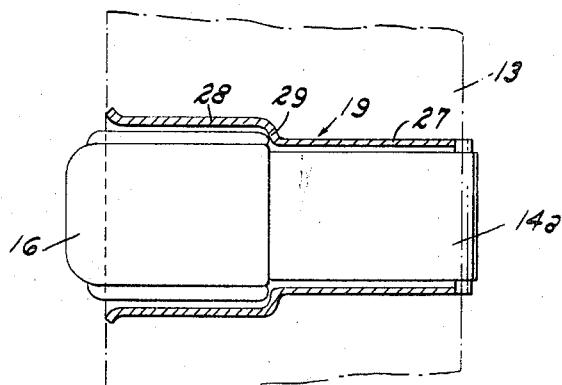
T. M. McCALL
INVENTOR.
E. C. McRAE
BY J. R. FAULKNER
T. H. OSTER
ATTORNEYS 2,939,519
Patented June 7, 1960

2,939,519
SEAT BELT RETRACTING MECHANISM

Thomas M. McCall, Farmington, Mich., assignor to Ford Motor Company, Dearborn, Mich., a corporation of Delaware Filed Sept. 27, 1956, Ser. No. 612,459

10 Claims. (Cl. 155—189)

This invention relates generally to retracting mechanisms for motor vehicle seat belts.

An object of this invention is to provide a retracting mechanism for a motor vehicle seat belt which will retract the intermediate portion of the seat belt into the space between the vehicle floor panel and the seat cushion so that the upper portion of the seat cushion will be unobstructed when the belt is not in use.

A further object of the invention is to provide a seat belt retracting mechanism located beneath the seat cushion and thus hidden from view, yet adapted to be readily controlled by means of a manually operable control to automatically retract the seat belt into its retracted position beneath the seat cushion. The seat belt may be readily extended to its operative position by manually pulling the free ends of the seat belt forwardly, the retracting mechanism being automatically rendered inoperative when the seat belt ends have been fully extended.

Still another object of the present invention is to provide a seat belt retracting mechanism which is effective to retract the seat belt beneath the seat cushion when not in use yet which in no way interferes with the effectiveness of the seat belt during its normal use.

Another object of the invention is to provide, in combination with a seat belt retracting mechanism, a sheet metal guide positioned between the seat cushion and the seat back to guide the belt during its retracting movement and also to form a stop limiting the retracting movement of the belt. The guideway also forms a housing for the seat belt buckle and substantially conceals the latter from view.

Other objects and advantages of this invention will be made more apparent as this description proceeds, particularly when considered in connection with the accompanying drawings, wherein:

Figure 5 is a cross section taken on the line 5—5 of Figure 2, through the latch.

Figure 6 is a cross section taken on the line 6—6 of Figure 5.

Figure 7 is a perspective view, partly broken away and in section, of the seat belt guideway.

Figure 8 is a horizontal cross sectional view through the guideway shown in Figure 7.

Figure 1:
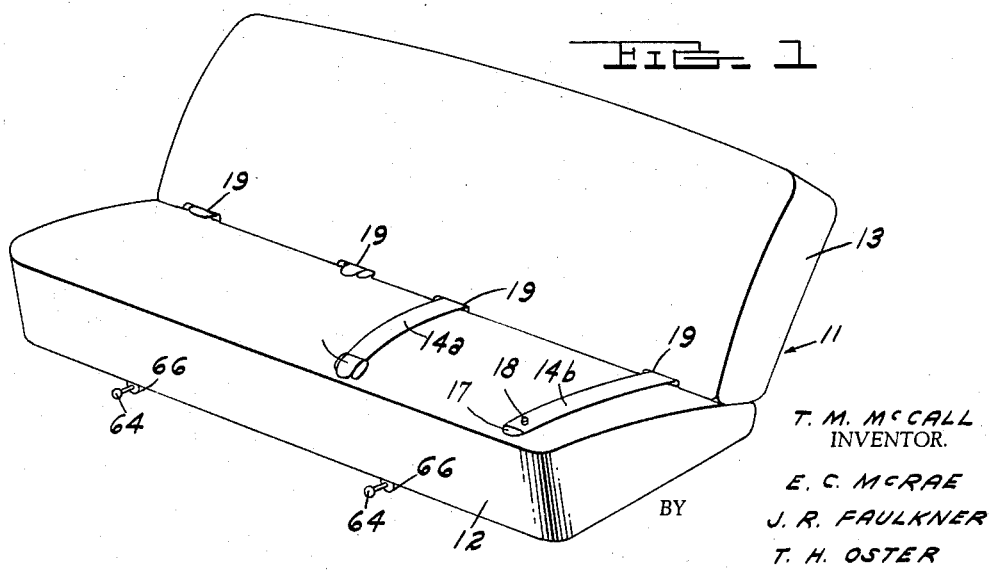
Figure 1 is a perspective view of the front seat of a motor vehicle incorporating the present invention.

Referring now to the drawings, and particularly to Figure 1, the reference character 11 indicates generally a vehicle seat having a seat cushion 12 and a seat back 13. The reference characters 14a and 14b indicate the two sections of the seat belt assembly for the left side of the seat. A buckle 16 is secured to the forward end of the seat belt section 14a and is adapted to receive the free terminal end 17 of the seat belt section 14b to encircle the body of the passenger when in operative use. An enlarged stop or button 18 is mounted upon the forward end of the seat belt section 14b adjacent the tip 17, for a purpose to be explained more in detail hereinafter.

A pair of sheet metal guideways 19 are carried at the rearward end of the seat cushion 12 between the seat cushion and the seat back 13. These guideways will be described more in detail hereinafter. It will be noted that the seat belt at the right side of the seat 11 is shown in its retracted position, with only the buckle 16 and tip 17 projecting from the guideways 19. By providing mechanism for retracting the seat belts to this position, the belts do not interfere with the movement of the passengers into and out of the seat, yet are in position for immediate use when desired.

Figure 2:
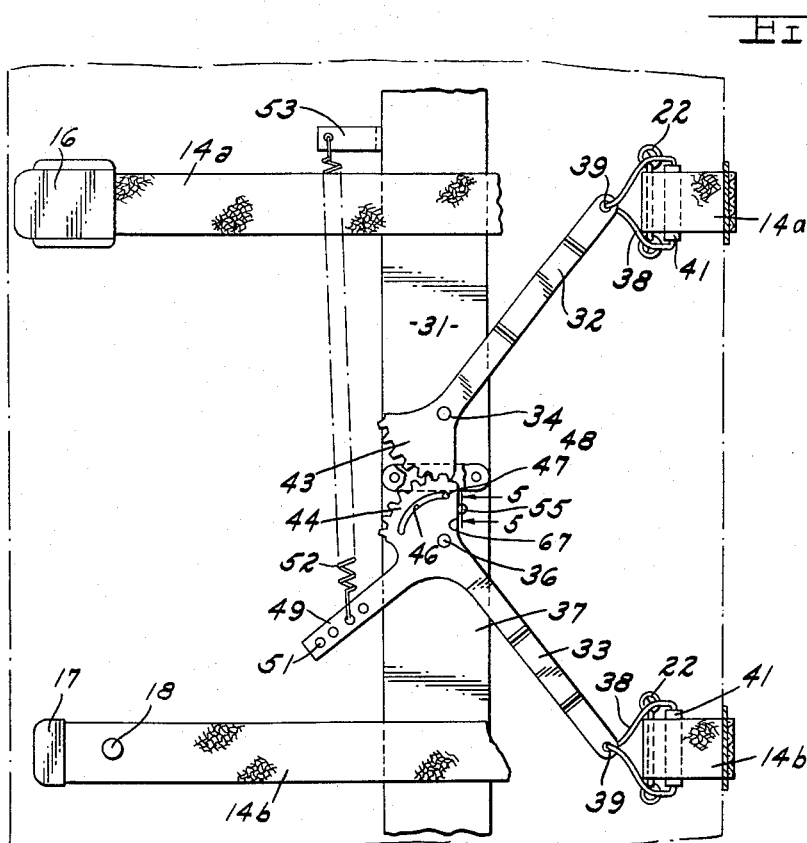
Figure 2 is a plan view of the seat belt retracting mechanism.
Figure 3:
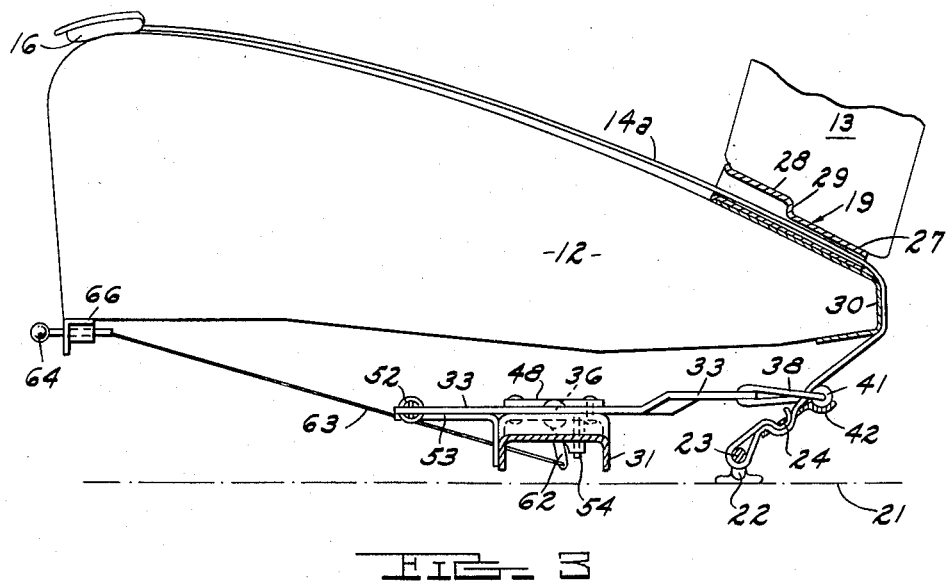
Figure 3 is a side elevational view, partly in section, of the structure shown in Figure 2, showing the seat belt in its operative extended position.
Figure 4:
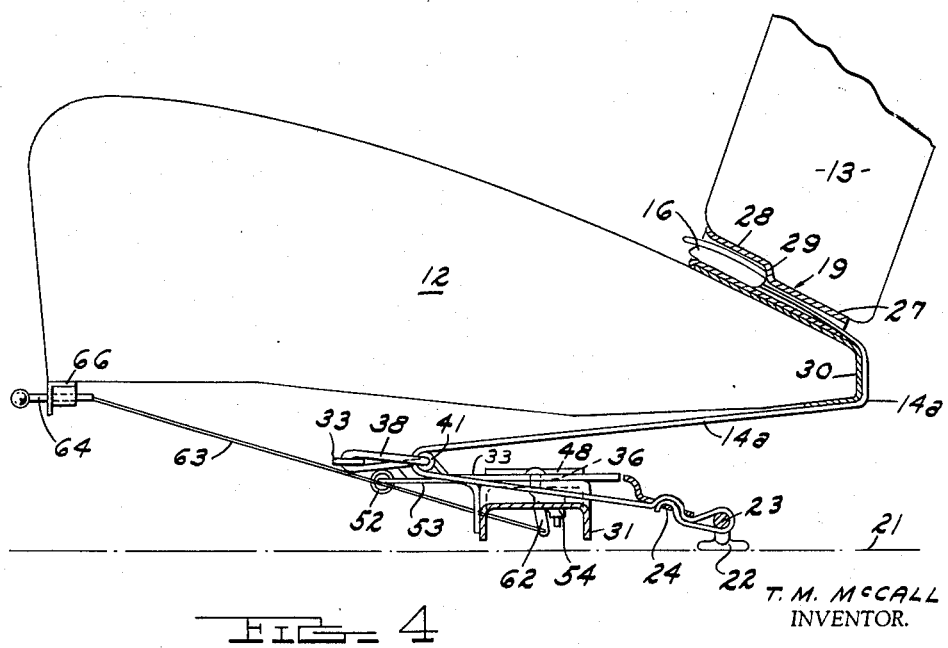
Figure 4 is a view similar to Figure 3 but showing the seat belt in its retracted position.

Referring now to Figures 2, 3 and 4, it will be seen that each of the seat belt sections 14a and 14b are anchored to the vehicle floor 21 at their lower ends by means of a conventional anchor bracket 22. The end of the seat belt section is looped around the upper bar 23 of the anchor and is threaded through a conventional slotted adjusting plate 24 to form a positive attachment and also to permit adjustment of the length of the belt to accommodate various persons. From their anchored ends the seat belt sections 14a and 14b extend upwardly around the rearward portion of the seat cushion 12 and through the sheet metal guideways 19 carried by the seat cushion and located between the seat cushion 12 and seat back 13.

Reference is made to Figures 3, 7 and 8 for a disclosure of the guideways 19, which are identical. Each guideway has an enclosed rearward section 27 having internal cross sectional dimensions corresponding generally but somewhat larger than the cross section dimensions of the fabric portions of the seat belt sections to guide the latter yet permit free sliding movement of the belt therethrough. The forward sections 28 are likewise enclosed but are larger both in width and in height than the rearward sections 27, these dimensions being such as to permit the buckle 16 at the forward end of the seat belt to be received within the enlarged portion of the guideway.

At the juncture between the rearward and forward sections 27 and 28 of the guideway there is formed a wall 29 functioning as a stop to engage the rearward end of the seat belt buckle and to limit further rearward movement thereof. The longitudinal dimension of the enlarged forward portion 28 of the guideway is such as to permit the major portion of the buckle to be received therein yet to permit the forward tip thereof to protrude so that it may be manually grasped to enable the belt to be withdrawn from its retracted position.

In this connection it should be noted that the button 18 secured to the forward end of the seat belt section 14b protrudes from the upper surface of the seat belt and is adapted to engage the partition 29 in the guideway 19 to limit the rearward movement of this seat belt section and to enable the tip 17 to protrude slightly from the guideway in its fully retracted position .

The guideways are formed with downwardly depending flanges 30 at their rearward ends forming bearing surfaces for the belt sections and facilitating the retracting and extending movements of the belt thereover.

A supporting bracket 31, generally an inverted U-shaped member, is suitably mounted upon the frame work (not shown) of the seat cushion beneath the latter so as to be carried thereby during the longitudinal adjustment of the seat cushion if such adjustment is provided.

Conventionally front seats are longitudinally adjustable while rear seats are not.

A pair of retracting levers 32 and 33 are pivotally connected at 34 and 36 to the upper web 37 of the supporting bracket 31 for swinging movement substantially in a horizontal plane. At their terminal ends, the levers 32 and 33 carry members 38 which embrace and encircle intermediate portions of the seat belt sections 14a and 14b. The members 38 may be formed of wire or sheet metal and have eye portions 39 pivotally connected to the terminal ends of the levers 32 and 33. To facilitate free sliding movement of the members 38 along the seat belt sections, rollers 41 are carried thereby for engaging the belts. With particular reference to Figure 3 it will be noted that the slotted adjusting plates 24 are formed with offset arcuate marginal flanges 42 adapted to receive and support the rollers 41 when the seat belt sections are in their extended operative positions.

The ends of the retracting levers 32 and 33 which are pivotally mounted upon the supporting bracket 31 are formed with toothed sectors 43 and 44 engaging each other and insuring simultaneous and opposite swinging movement of the levers. The sector 44 of the lever 33 is formed with an arcuate slot 46 receiving a pin 47 extending upwardly from the supporting bracket 31 to limit the range of arcuate swinging movement of the levers. A retaining bracket 48 is secured to the supporting bracket 31 and overlaps the sectors 43 and 44 adjacent their interengaged marginal edges to guide the latter. The retracting lever 33 is formed with a forwardly projecting arm 49 having a series of holes 51 to receive one end of a tension coil spring 52, the opposite end of which is connected to a flange 53 secured to the supporting bracket 31.

Referring now to Figures 2, 5 and 6, a latch bracket 54 is secured to the lower portion of the upper web 37 of the supporting bracket 31 and supports and guides a vertically slidable latch plunger 55 spring urged upwardly by means of a coil spring 56. The plunger 55 carries a pin 57 guided by opposed slots 58 in the latch bracket. The latch bracket also pivotally supports a release lever 59 in the form of a bell crank having an upper arm 61 engaging cross pin 57 and a lower depending arm 62 connected by means of a wire 63 to a manually operable release knob 64 mounted upon a bracket 66 at the forward lower edge of the seat cushion 12.

Figures 2 and 3 illustrate the extended operative position of the seat belt sections 14a and 14b. In this position the latch plunger 55 engages the adjacent edge 67 of the retracting lever 33 to hold the levers in their rearmost position. It will be noted that in this position the retracting mechanism does not interfere with the direct anchoring of the rearward ends of the seat belt sections to the floor brackets 22.

When it is desired to retract the seat belt it is only necessary to operate the manual control knob 64 to withdraw the latch plunger 55, permitting the spring 52 to simultaneously swing the retracting levers 32 and 33 forwardly. By reason of the engagement of the intermediate portions of the seat belt sections by the members 38, the belt sections are withdrawn into the space between the floor panel 21 and the seat cushion 12, as shown in Figure 4. This retracting movement continues until the buckle 16 and the enlarged button 18 on the seat belt sections 14a and 14b respectively are stopped by the partition walls 29 in the guideways 19. The seat belt sections remain in this retracted position until the protruding portions of the buckle 16 and the tip 17 are manually grasped and pulled forwardly to their extended operative positions. When they are completely extended, the latch plunger 55 automatically engages the rearward edge 67 of the retracting lever 33 to hold the levers in their inoperative position, ready for subsequent operation when the knobs 64 are again operated.

It will be understood that the invention is not to be limited to the exact construction shown and described, but that various changes and modifications may be made without departing from the spirit and scope of the invention as defined in the appended claims.

What is claimed is:

1. In a motor vehicle, a floor structure, a seat mounted upon said floor structure in such manner as to provide a space therebetween, a seat belt adapted to extend over said seat and having one end anchored to said floor, a supporting bracket mounted beneath said seat, a lever pivotally mounted adjacent one end thereof upon said bracket for swinging movement in a generally horizontal plane, the pivotal mounting of said lever being offset laterally from said seat belt, means at the other end of said lever freely embracing an intermediate portion of said seat belt, and means for swinging said lever to retract the intermediate portion of said seat belt into the space between said floor and said seat.

2. In a motor vehicle, a floor structure, a seat mounted upon said floor structure in such manner as to provide a space therebetween, a vehicle seat belt assembly including a pair of belt portions adapted to extend over said seat and each having one end anchored to said floor, a supporting bracket mounted beneath said seat, a pair of levers pivotally mounted upon said bracket for swinging movement in a generally horizontal plane, the pivotal axes for said levers being spaced laterally from each other and being located centrally between said belt portions, cooperating gear sectors on said levers compelling simultaneous and oppositely directed swinging movement of said levers, means carried on said levers freely embracing intermediate portions of said belt portions between said floor and said seat, and spring means acting upon one of said levers to swing said levers in a direction to retract the intermediate portions of said belt portions into the space between said floor and said seat.

3. The structure defined by claim 2 which is further characterized in that a latch is movably mounted upon said supporting bracket and engages one of said levers to prevent retracting movement of said levers under the action of said spring, and manually operable means connected to said latch to release the latter from restraining engagement with said last mentioned lever.

4. The structure defined by claim 1 which is further characterized in that the seat belt has an enlargement at its free end, a guideway mounted upon said seat adjacent the rearward edge thereof for guiding said seat belt during its retracting movement, said guideway having stop means associated therewith engageable by the enlargement at the free end of said seat belt for limiting the retracile movement of said belt.

5. The structure defined by claim 2 which is further characterized in that the means carried on said levers comprise looped members pivotally connected to said levers and embracing the intermediate portions of said belt portions.

6. The structure defined by claim 5 which is further characterized in that an adjusting plate is carried by each of said belt portions adjacent its anchored end, said adjusting plates having supporting flanges extending outwardly from the plane of said belt portions for engaging and supporting the looped members of said levers in the operative extended positions of said belt portions.

7. The structure defined by claim 4 which is further characterized in that said guideway comprises a hollow sheet metal member having a reduced rearward portion corresponding in internal dimensions to the dimensions of said seat belt to guide the belt and permit free sliding movement of the belt therethrough, said guideway also having an enlarged forward portion having internal dimensions greater than said rearward portion to receive the enlargement at the free forward end of said seat belt, the juncture between said reduced and enlarged portions of said guideway forming the stop means for limiting retractile movement of said seat belt upon engagement thereby of said enlargement.

8. The structure defined by claim 3 which is further characterized in that said latch comprises a vertically movable spring urged plunger mounted upon said supporting bracket, a pivotally mounted release lever engageable with said plunger, a manually operable control mounted upon the lower portion of said seat adjacent the forward edge thereof, and interconnecting means between said manually operable control and said lever to retract said plunger upon operation of said lever to release said latch.

9. In a motor vehicle, a floor structure, a seat mounted upon said floor structure in such manner as to provide a space therebetween, a seat belt assembly including a pair of belt portions adapted to extend over said seat and each having one end anchored to said floor, a pair of members mounted beneath said seat for swinging movement about generally vertical axes, said axes being spaced laterally from each other and being transversely located generally centrally of said seat, means compelling simultaneous and oppositely directed swinging movement of said members, means on each of said members engaging intermediate portions of said belt portions between said floor and said seat to retract said intermediate portions into the space between said floor and said seat upon pivotal movement of said members.

10. The structure defined by claim 9 which is further characterized in that the means engaging said seat belt freely embraces said seat belt, and an anti-friction element on said last mentioned means engageable with said belt.

References Cited in the file of this patent

UNITED STATES PATENTS

| | | |
|---|---|---|
| 2,468,560 | Kirkpatrick | Apr. 26, 1949 |
| 2,488,858 | Franz | Nov. 22, 1949 |
| 2,649,145 | McCarthy | Aug. 18, 1953 |
| 2,680,476 | Saffell | June 8, 1954 |
| 2,701,656 | French | Feb. 8, 1955 |
| 2,705,115 | Ewing | Mar. 29, 1955 |
| 2,798,539 | Johnson | July 9, 1957 |
| 2,830,655 | Lalande | Apr. 15, 1958 |
| 2,861,627 | Smith | Nov. 25, 1958 |

OTHER REFERENCES

Periodical SAE Journal; Dec. issue (vol. 63, No. 12), pages 45–47 only.

Ford Field, Sept. 1954 issue; vol. 56, No. 9, pages 16 and 34.